United States Patent
McDaniel et al.

(10) Patent No.: US 6,714,370 B2
(45) Date of Patent: Mar. 30, 2004

(54) WRITE HEAD AND METHOD FOR RECORDING INFORMATION ON A DATA STORAGE MEDIUM

(75) Inventors: Terry W. McDaniel, Volcano, CA (US); Thierry R. Valet, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/245,189

(22) Filed: Sep. 17, 2002

(65) Prior Publication Data

US 2003/0128452 A1 Jul. 10, 2003

Related U.S. Application Data

(60) Provisional application No. 60/346,432, filed on Jan. 7, 2002.

(51) Int. Cl.[7] .................................................. G11B 5/02
(52) U.S. Cl. ............... 360/59; 369/112.09; 369/112.14; 369/112.21; 369/112.27; 369/13.02; 369/13.3
(58) Field of Search .............................. 360/284.5, 126, 360/59; 369/121, 112–113, 13.33, 13.02; 398/1; 385/33

(56) References Cited

U.S. PATENT DOCUMENTS

| | | |
|---|---|---|
| 4,684,206 A | 8/1987 | Bednorz et al. |
| 5,161,134 A | 11/1992 | Lee |
| 5,272,330 A | 12/1993 | Betzig et al. |
| 5,286,971 A | 2/1994 | Betzig et al. |
| 5,295,122 A | 3/1994 | Murakami et al. |
| 5,497,359 A | 3/1996 | Mamin et al. |
| 5,689,480 A | 11/1997 | Kino |
| 5,696,372 A | 12/1997 | Grober et al. |
| 5,808,973 A | 9/1998 | Tanaka |
| 5,859,814 A | 1/1999 | Kino et al. |
| 5,866,911 A | 2/1999 | Baer |
| 5,883,872 A | 3/1999 | Kino |
| 5,930,434 A | 7/1999 | Mowry et al. |
| 5,946,281 A | 8/1999 | Ito et al. |
| 5,959,957 A | 9/1999 | Ikeda et al. |
| 5,963,532 A | 10/1999 | Hajjar |
| 5,986,978 A | 11/1999 | Rottmayer et al. |
| 5,986,995 A | 11/1999 | He et al. |
| 6,016,290 A | 1/2000 | Chen et al. |
| 6,160,652 A | * 12/2000 | Nir .............................. 398/1 |

(List continued on next page.)

FOREIGN PATENT DOCUMENTS

| | | |
|---|---|---|
| EP | 1039458 A2 | 9/2000 |
| EP | 1148370 A2 | 10/2001 |
| JP | 2001028109 A | 1/2001 |

OTHER PUBLICATIONS

J. Cha et al., "Near–field Optical Data Storage Using a Nanometric Aperture Array." *Journal of the Korean Physical Society*, vol. 37, No. 5, Nov. 2000, pp. 735–738.

*Primary Examiner*—Andrew L. Sniezek
*Assistant Examiner*—Rocio Colon
(74) *Attorney, Agent, or Firm*—Robert P. Lenart, Esq.; Pietragallo, Bosick & Gordon

(57) ABSTRACT

A recording head for use in conjunction with a magnetic storage medium, comprises a waveguide for providing a path for transmitting radiant energy, a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface, and applying a magnetic write field to sections of the magnetic recording medium heated by the radiant energy. A disc drive including the recording head and a method of recording data using the recording head are also provided.

20 Claims, 3 Drawing Sheets

U.S. PATENT DOCUMENTS

| | | |
|---|---|---|
| 6,219,332 B1 | 4/2001 | Boutaghou |
| 6,236,514 B1 | 5/2001 | Sato |
| 6,243,350 B1 | 6/2001 | Knight et al. |
| 6,272,097 B1 | 8/2001 | Nakao et al. |
| 6,298,026 B1 | 10/2001 | Suzuki et al. |
| 6,304,522 B1 | 10/2001 | Valet et al. |
| 6,304,527 B1 | 10/2001 | Ito et al. |
| 6,307,827 B1 | 10/2001 | Nishiwaki |
| 6,324,129 B1 | 11/2001 | Durnin et al. |
| 6,376,827 B1 * | 4/2002 | Kasama et al. ............. 369/121 |
| 6,408,123 B1 | 6/2002 | Kuroda et al. |
| 2001/0004348 A1 | 6/2001 | Ueyanagi |
| 2001/0006436 A1 * | 7/2001 | Akiyama et al. ............. 360/59 |
| 2001/0009541 A1 | 7/2001 | Ueyanagi |
| 2001/0021208 A1 | 9/2001 | Ueyanagi |
| 2001/0030928 A1 * | 10/2001 | Cheong et al. ........ 369/112.08 |
| 2001/0030938 A1 | 10/2001 | Oumi et al. |
| 2001/0050896 A1 | 12/2001 | Hajjar et al. |
| 2002/0080709 A1 | 6/2002 | Park et al. |
| 2002/0135935 A1 * | 9/2002 | Covington .................. 360/126 |
| 2002/0163761 A1 * | 11/2002 | Crawford ................. 360/234.5 |

* cited by examiner

WRITE HEAD AND METHOD FOR RECORDING INFORMATION ON A DATA STORAGE MEDIUM

CROSS REFERENCE TO RELATED APPLICATION

This application claims the benefit of U.S. Provisional Application No. 60/346,432, filed Jan. 7, 2002.

FIELD OF THE INVENTION

This invention relates to the field of data storage, and more particularly to write heads and methods for recording information on data storage media using near-field optical coupling structures.

BACKGROUND OF THE INVENTION

Magnetic recording heads are used in magnetic disc drive storage systems. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with perpendicular magnetic storage media may include a pair of magnetically coupled poles, including a write pole having a relatively small bottom surface area and a return pole having a larger bottom surface area. A coil having a plurality of turns is located adjacent to the write pole for inducing a magnetic field between the pole and a soft underlayer of the storage media. The soft underlayer is located below a hard magnetic recording layer of the storage media and enhances the amplitude of the field produced by the write pole. In the recording process, an electric current in the coil energizes the write pole, which produces a magnetic field. The image of this field is produced in the soft underlayer to enhance the field strength produced in the magnetic media. Magnetic flux that emerges from the write pole passes into the soft underlayer and returns through the return flux pole. The return pole is located sufficiently far apart from the main write pole such that the material of the return pole does not affect the magnetic flux of the write pole, which is directed vertically into the hard layer of the storage media. This allows the use of storage media with higher coercive force, consequently, more stable bits can be stored in the media.

As the magnetic media grain size is reduced for high areal density recording, superparamagnetic instabilities become an issue. The superparamagnetic effect is most evident when the grain volume V is sufficiently small that the inequality $K_U V/k_B T > 40$ can no longer be maintained. $K_u$ is the material's magnetic crystalline anisotropy energy density, $k_B$ is Boltzmann's constant, and T is absolute temperature. When this inequality is not satisfied, thermal energy demagnetizes the individual grains and the stored data bits will not be stable. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, the available recording heads are not able to provide a sufficient or high enough magnetic writing field to write on such a medium. Heat assisted magnetic recording, sometimes referred to as optical or thermal assisted recording, has been proposed to overcome at least some of the problems associated with the superparamagnetic effect. Heat assisted magnetic recording generally refers to the concept of locally heating a recording medium to reduce the coercivity of the recording medium so that an applied magnetic writing field can more easily direct the magnetization of the recording medium during the temporary magnetic softening of the recording medium caused by the heat source.

By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information. When applying a heat or light source to the medium, it is desirable to confine the heat or light to the track where writing is taking place and to generate the write field in close proximity to where the medium is heated to accomplish high areal density recording. The separation between the heated spot and the write field spot should be minimal or as small as possible so that writing may occur while the medium temperature is substantially above ambient temperature. This also provides for the efficient cooling of the medium once the writing is completed.

In order to increase areal density in an optically assisted write head, the spot size of the optical beam can be decreased by either decreasing the wavelength of the light or increasing the numerical aperture of the focusing elements. Other optical techniques which either directly or indirectly reduce the effective optical spot size are generally referred to as "superresolution" techniques. For example, it is well known that the resolving power of a microscope can be increased by placing an aperture with a pinhole (having a diameter smaller than the focused spot size) sufficiently close to the object being observed. As another example, tapered optical fibers have been used to achieve superresolution in near field scanning optical microscopy.

There is identified a need for an improved magnetic recording head that overcomes limitations, disadvantages, and/or shortcomings of known optically assisted magnetic recording heads.

SUMMARY OF THE INVENTION

This invention provides a recording head for use in conjunction with a magnetic storage medium, comprising a waveguide for providing a path for transmitting radiant energy; a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface; and means for applying a magnetic write field to sections of the magnetic recording medium heated by the radiant energy.

The recording head can further comprise a semi-reflective layer positioned in the path to form a resonant cavity with a surface of the magnetic storage medium. The means for applying a magnetic write field to the magnetic recording medium can comprise a magnetic yoke having a write pole, a return pole, and a coil for producing magnetic flux in the yoke, wherein the near-field coupling structure is position adjacent to the write pole.

The waveguide can comprise a transparent layer mounted adjacent to the write pole, wherein the write pole is located down track from the near-field coupling structure. The near-field coupling structure can form a square opening adjacent to the air bearing surface of the recording head.

The invention also encompasses a magnetic disc drive storage system comprising a housing; means for supporting a magnetic storage medium positioned in the housing; and means for positioning a recording head adjacent to the rotatable magnetic storage medium, wherein the recording head includes a waveguide for providing a path for transmitting radiant energy; a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface; and means for applying a magnetic write field to sections of the magnetic recording medium heated by the radiant energy.

The invention further encompasses a method of recording data on a data storage medium, comprising heating a section of the data storage medium by applying radiant energy to a waveguide including a transparent layer, a semi-reflective layer, and a near-field coupling structure at a frequency such that radiant energy resonates between the semi-reflective layer and a surface of the data storage medium; and applying a magnetic write field to the section of data storage medium.

DETAILED DESCRIPTION OF THE INVENTION

Figure 1:
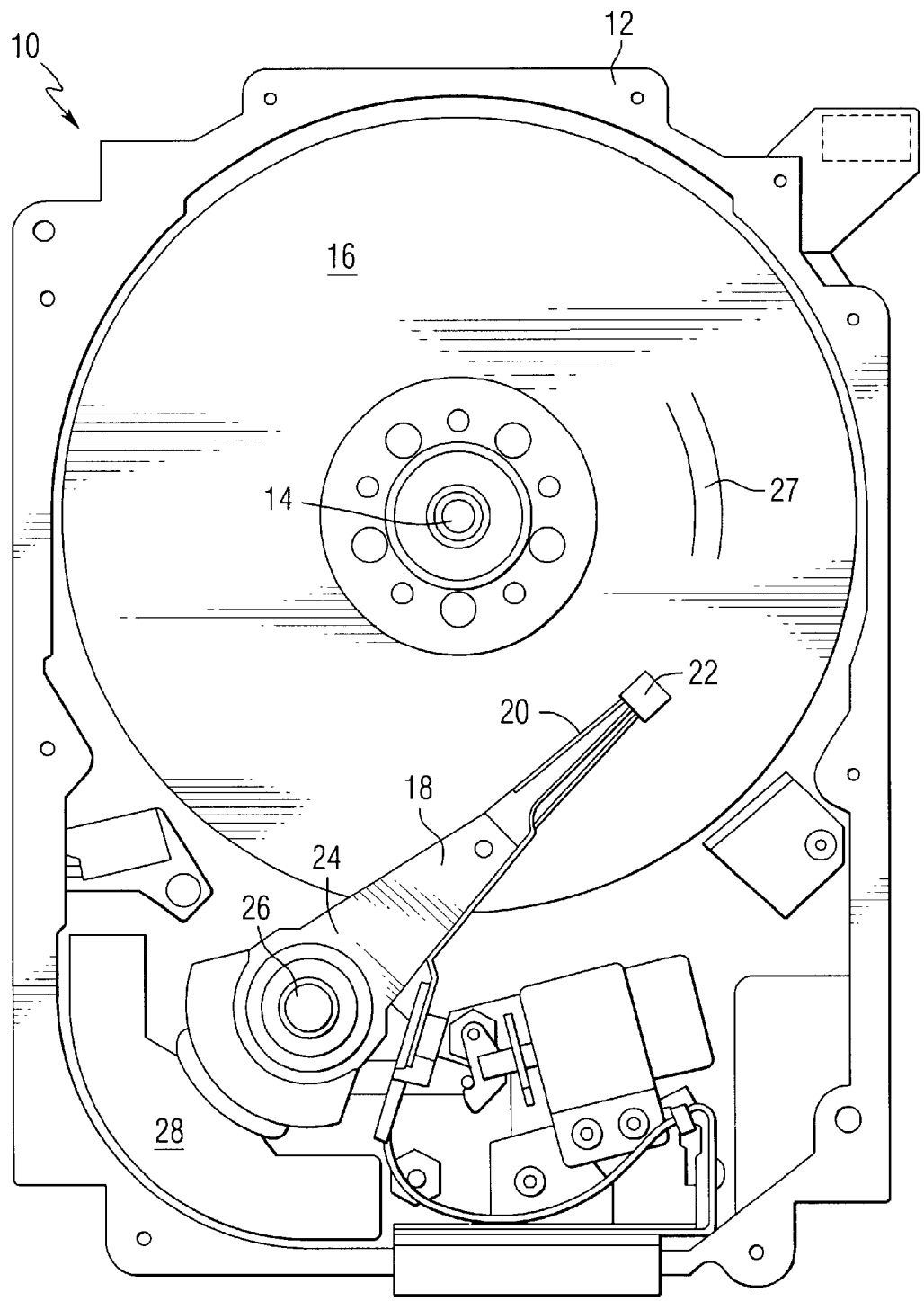
FIG. 1 is a pictorial representation of a disc drive that can include a recording head constructed in accordance with this invention.

Referring to the drawings, FIG. 1 is a pictorial representation of a disc drive 10 that can use a recording head constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16. At least one arm 18 is contained within the housing 12, with the arm 18 having a first end 20 for supporting a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is controlled by a controller, which is not shown in this view and is well known in the art.

Figure 2:
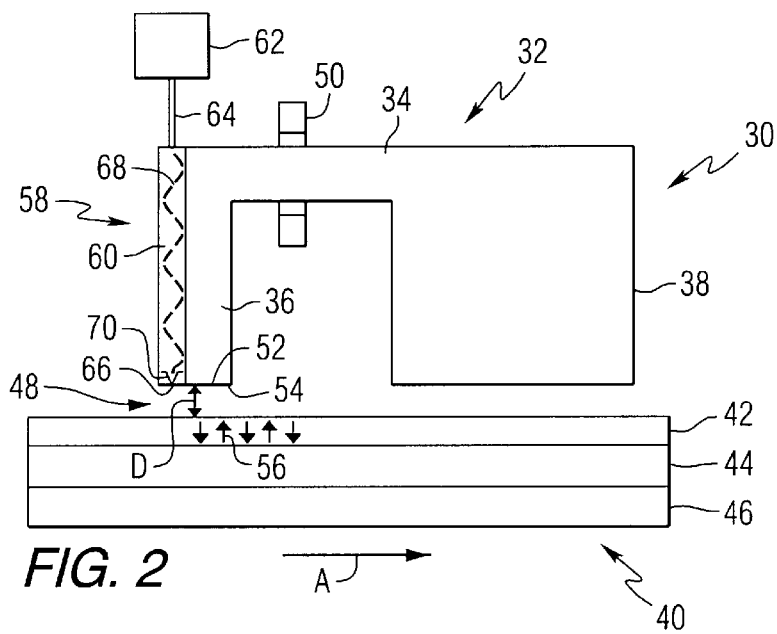
FIG. 2 is a side view of a recording head constructed in accordance with the invention.

FIG. 2 is a partially schematic side view of a perpendicular magnetic recording head 30 constructed in accordance with the invention. The recording head includes a magnetic write head 32 that is constructed using known technology and includes a yoke 34 that forms a write pole 36 and a return pole 38. The recording head 30 is positioned adjacent to a perpendicular magnetic storage medium 40 having a magnetically hard layer 42 and a magnetically soft layer 44 supported by a substrate 46. An air bearing 48 separates the recording head from the storage medium by a distance D. A coil 50 is used to control the magnetization of the yoke to produce a write field at an end 52 of the write pole adjacent to an air bearing surface 54 of the write head. The recording head 30 can also include a read head, not shown, which may be any conventional type read head as is generally known in the art.

The perpendicular magnetic storage medium 40 is positioned adjacent to or under the recording head 30 and travels in the direction of arrow A. The recording medium 40 includes a substrate 46, which may be made of any suitable material such as ceramic glass or amorphous glass. A soft magnetic underlayer 44 is deposited on the substrate 46. The soft magnetic underlayer 44 may be made of any suitable material such as, for example, alloys or multilayers having Co, Fe, Ni, Pd, Pt or Ru. A hard magnetic recording layer 42 is deposited on the soft underlayer 44, with the perpendicular oriented magnetic domains 56 contained in the hard layer 42. Suitable hard magnetic materials for the hard magnetic recording layer 42 may include at least one material selected from, for example, FePt or CoCrPt alloys having a relatively high anisotropy at ambient temperature.

The recording head 30 also includes means for heating the magnetic storage medium 40 proximate to where the write pole 36 applies the magnetic write field H to the storage medium 40. Specifically, the means for heating includes an optical waveguide 58 formed by a transparent layer 60. The optical waveguide 58 acts in association with a source 62 of radiant energy which transmits radiant energy via an optical fiber 64 that is in optical communication with the optical waveguide 60. The radiant energy can be, for example, visible light, infrared or ultra violet radiation. The source provides for the generation of surface plasmons or guided modes that travel through the optical waveguide 58 toward a heat emission surface 66 that is formed along the air-bearing surface thereof. The transmitted radiant energy, generally designated by reference number 68, passes from the heat emission surface 66 of the optical waveguide 58 to the surface of the storage medium for heating a localized area of the storage medium 40, and particularly for heating a localized area of the hard magnetic layer 42.

The source 62 may be, for example, a laser diode, or other suitable laser light source. At the surface of the medium 40, the surface plasmons convert a portion of their energy into heat in the medium 40. The transparent layer may be formed, for example, from a silica based material, such as $SiO_2$. The transparent layer should be a non-conductive dielectric, and have extremely low optical absorption (high transmissivity). It will be appreciated that in addition to the transparent layer, the waveguide 58 may include an optional cladding layer, such as aluminum, positioned adjacent the transparent layer or an optional overcoat layer, such as an alumina oxide, for protecting the waveguide 58.

In addition, the waveguide 58 includes a near-field coupling structure 70 for confining the radiant energy to the recording spot. Specifically as shown in FIGS. 3, 4 and 5, the near-field coupling structure includes a plurality of arms 72, 74, 76 and 78.

Figure 3:
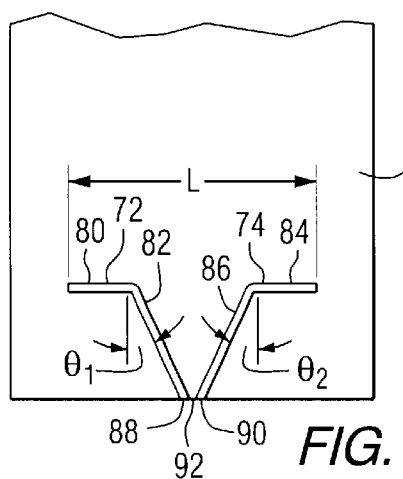
FIG. 3 is a cross-sectional view of a portion of the waveguide of the recording head of FIG. 2.

FIG. 3 is an enlarged cross-sectional view of a portion of the optical waveguide 58. The waveguide includes a transparent layer 60 and first and second arms 72 and 74, which in this embodiment are embedded within the transparent layer 60. Arm 72 includes a first section 80 that is positioned substantially parallel the surface of the storage medium, and a second section 82 that extends from the first section toward the air bearing surface at a first angle $\theta_1$. Arm 74 includes a first section 84 that is positioned substantially parallel the surface of the storage medium, and a second section 86 that extends from the first section toward the air bearing surface at a second angle $\theta_2$. The ends 88 and 90 of the second sections of arms 72 and 74 are separated to form a gap 92. The gap has a width that can be, for example, less than 50 nm. The width of the gap determines the breadth of the near radiation field, and the resulting thermal field in the medium is desired to be no larger than 50 nm in the largest dimension.

Figure 4:
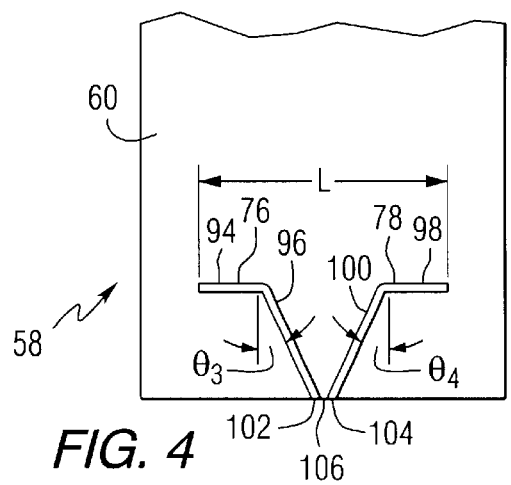
FIG. 4 is a cross-sectional view of the portion of the waveguide of FIG. 3 taken in a plane perpendicular to the view shown in FIG. 3.

FIG. 4 is an enlarged cross-sectional view of the portion of the optical waveguide 58 of FIG. 3 taken in a plane perpendicular to the plane of FIG. 3. The waveguide is shown to further include third and fourth arms 76 and 78, which are also embedded within the transparent layer. Arm 76 includes a first section 94 that is positioned substantially parallel the surface of the storage medium, and a second section 96 that extends from the first section toward the air bearing surface at a first angle $\theta_3$. Arm 78 includes a first section 98 that is positioned substantially parallel the surface of the storage medium, and a second section 100 that extends from the first section toward the air bearing surface at a second angle $\theta_4$. The ends 102 and 104 of the second sections of arms 76 and 78 are separated to form a gap 106.

Figure 5:
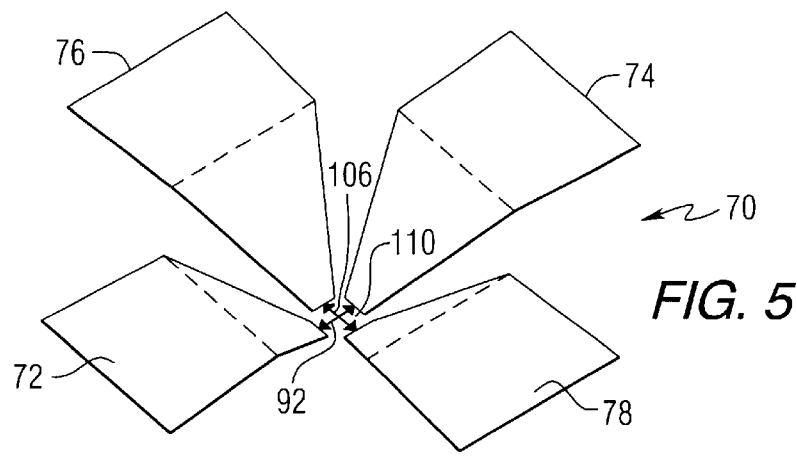
FIG. 5 is an isometric view of the near-filed coupling structure of the recording head of FIG. 2.

FIG. 5 is an isometric view of the arms 72, 74, 76 and 78, which are positioned together to form the near-field coupling structure 70. In this view, the bent sections of the arms are seen to have a trapezoidal shape. The ends of the arms form an opening 110 for passage of radiant energy from the light source. While the opening is illustrated as having a square shape, it will be appreciated that other shapes can be used. The arms should be made of excellent conductors in the optical frequency band, such as Au, Ag or Cu. The overall length of the arms, designated as L in FIGS. 3 and 4, can be determined by a resonant condition with the exciting radiation in the waveguide, so that the overall length of a pair of arms will be comparable to an integer multiple of half or full wavelengths of the radiation in the waveguide. This will achieve a resonant coupling condition. The overall length is the total span of the antenna formed by arms 72, 74, 76 and 78. That is, for example, the distance from the outside edge of arm section 80 to the outside edge of arm section 84 in FIG. 3. This distance is distinct from, and independent of, the gap length of the structure. The opening or gap between the arms is comparable to the desired near radiation field extent, as indicated above.

To most effectively heat the recording medium 40, the heat emission surface 66 of the optical waveguide 58 is preferably spaced apart from the medium 40 and, more specifically, spaced apart from the hard magnetic layer 42, by a distance of about 2 nm to about 50 nm. It will be appreciated that the separation distance is also dependent on the fly height required to maintain acceptable reading and writing (electromagnetic coupling for heating) by the recording head 30.

The write head of FIG. 2 allows for heating of the recording medium 40 in close proximity to the write pole 36, which applies a magnetic write field H to the recording medium 40. It also provides for the ability to align the waveguide 58 with the write pole 36 to maintain the heating application in the same track of the medium 40 where the writing is taking place. Locating the optical waveguide 58 adjacent to the write pole 36, provides for increased writing efficiency due to the write field H being applied immediately down track from where the recording medium 40 has been heated. The hot spot will ideally raise the temperature of the medium 40 to approximately 200° C. The recording takes place at the thermal profile, which can also be called the thermal field or the thermal distribution, in the medium 40 for which the coercivity is equal to the applied recording field. Ideally, this thermal profile should be near the edge of the write pole 36 where the magnetic field gradients are the largest. This will record the sharpest transition in the medium 40. The optical waveguide 58 may be integrally formed with the write pole 36.

In operation, the recording medium 40 passes under the recording head 30, in the direction indicated by arrow A in FIG. 2. The source 62 transmits radiant energy via the optical fiber 64 to the optical waveguide 58. The optical waveguide 58 transmits the optical energy for heating the storage medium 40. More specifically, a localized area of the recording layer 42 is heated to lower the coercivity thereof prior to the write pole 36 applying a magnetic write field H to the recording medium 40. Advantageously, this allows for higher coercivity storage media to be used while limiting the superparamagnetic instabilities that may occur with such recording media used for high recording densities.

At a down track location from where the medium 40 is heated, the magnetic write pole 36 applies a magnetic write field to the medium 40 for storing magnetic data in the recording medium 40. The write field H is applied while the recording medium 40 remains at a sufficiently high temperature for lowering the coercivity of the recording medium 40. This ensures that the write pole 36 can provide a sufficient or high enough magnetic write field to perform a write operation on the recording medium 40. As described herein, the recording head 30 advantageously allows for the point of writing to be in close proximity to where the recording medium 40 is heated.

Figure 6:
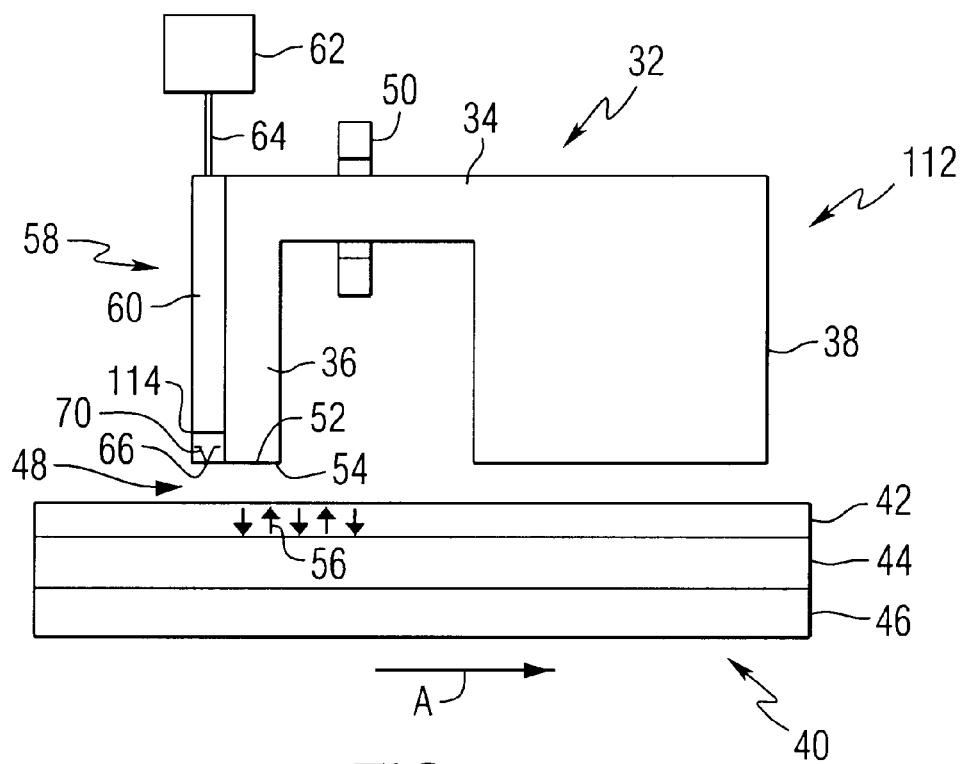
FIG. 6 is a side view of an alternative recording head constructed in accordance with the invention.

FIG. 6 is a side view of a recording head 112 that can be constructed in accordance with an alternative embodiment of the invention. In the embodiment of FIG. 6, a semitransparent layer 114 is added within a transparent layer 60.

Figure 7:
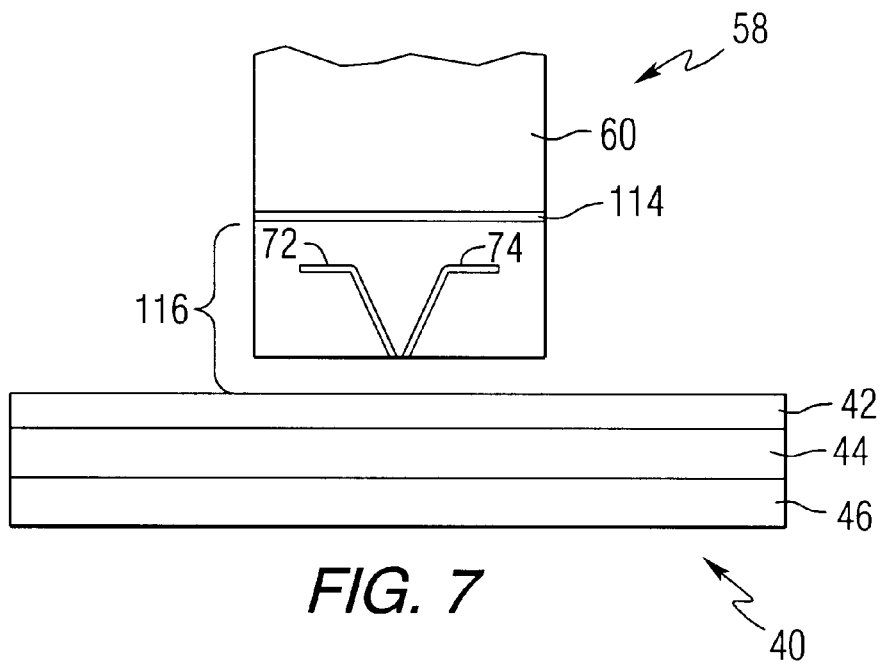
FIG. 7 is a cross-sectional view of a portion of the waveguide of the recording head of FIG. 6.

FIG. 7 is a cross-sectional view of a portion of the waveguide of FIG. 6. The semitransparent layer 114, in combination with the surface of the data storage medium creates a resonant cavity 116. The resonant cavity will enable "recycling" of the electromagnetic energy, and will thus enhance the throughput efficiency of the device. The height from the semitransparent layer to the reflecting surface can be comparable to an integer times half the wavelength of the radiation.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A recording head for use in conjunction with a magnetic storage medium, comprising:
   a waveguide for providing a path for transmitting radiant energy;
   a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface; and
   means for applying a magnetic write field to sections of the magnetic recording medium heated by the radiant energy.

2. The recording head of claim 1, further comprising:
   a semi-reflective layer positioned in the path to form a resonant optical cavity with a surface of the magnetic storage medium.

3. The recording head of claim 2, wherein the semi-reflective layer is positioned from the magnetic storage medium by a distance substantially equal to an integer times a half wavelength of the radiant energy.

4. The recording head of claim 1, wherein the means for applying a magnetic write field to the magnetic recording medium comprises:
   a magnetic yoke having a write pole, a return pole, and a coil for producing magnetic flux in the yoke, wherein the near-field coupling structure is position adjacent to the write pole.

5. The recording head of claim 4, wherein the waveguide comprises a transparent layer mounted adjacent to the write pole.

6. The recording head of claim 4, wherein the write pole is located down track from the near-field coupling structure.

7. The recording head of claim 1, wherein the plurality of arms comprises four arms and wherein the bent sections of the arms form a square opening adjacent to the air bearing surface.

8. The recording head of claim 1, wherein the length of the near-field coupling structure is substantially equal to an integer multiple of half or full wavelengths of the radiant in the waveguide.

9. A magnetic disc drive storage system, comprising:
   a housing;
   means for supporting a magnetic storage medium positioned in the housing; and
   means for positioning a recording head adjacent to the rotatable magnetic storage medium, the recording head including:
   a waveguide for providing a path for transmitting radiant energy;
   a near-field coupling structure positioned in the waveguide and including a plurality of arms, each having a planar section and a bent section, wherein the planar sections are substantially parallel to a surface of the magnetic storage medium, and the bent sections extend toward the magnetic storage medium and are separated to form a gap adjacent to an air bearing surface; and
   means for applying a magnetic write field to sections of the magnetic recording medium heated by the radiant energy.

10. The magnetic disc drive storage system of claim 9, wherein the recording head further comprises:
    a semi-reflective layer positioned in the path to form a resonant cavity with a surface of the magnetic storage medium.

11. The magnetic disc drive storage system of claim 10, wherein the semi-reflective layer positioned from the magnetic storage medium by a distance substantially equal to an integer times a half wavelength of the radiant energy.

12. The magnetic disc drive storage system of claim 9, wherein the means for applying a magnetic write field to the magnetic recording medium comprises:
    a magnetic yoke having a write pole, a return pole, and a coil for producing magnetic flux in the yoke, wherein the near-field coupling structure is position adjacent to the write pole.

13. The magnetic disc drive storage system of claim 12, wherein the waveguide comprises a transparent layer mounted adjacent to the write pole.

14. The magnetic disc drive storage system of claim 12, wherein the write pole is located down track from the near-field coupling structure.

15. The magnetic disc drive storage system of claim 9, wherein the plurality of arms comprises four arms and wherein the bent sections of the arms form a square opening adjacent to the air bearing surface.

16. The magnetic disc drive storage system of claim 9, wherein the means for applying a magnetic field comprises:
    a perpendicular write head.

17. The magnetic disc drive storage system of claim 9, wherein the length of the near-field coupling structure is substantially equal to an integer multiple of half or full wavelengths of the radiant energy in the waveguide.

18. A method of recording data on a magnetic storage medium, comprising:
    heating a section of the data storage medium by applying radiant energy to a waveguide including a transparent layer, a semi-reflective layer, and a near-field coupling structure at a frequency such that radiant energy resonates between the semi-reflective layer and a surface of the data storage medium; and
    applying a magnetic write field to the section of data storage medium heated by the radiant energy.

19. A method of recording data according to claim 18, wherein the near-field coupling structure is spaced apart from a surface of the data storage medium by a distance of about 2 nm to about 50 nm.

20. A method of recording data according to claim 18, wherein the semi-reflective layer positioned from the magnetic storage medium by a distance substantially equal to an integer times a half wavelength of the radiant energy.

* * * * *